Dec. 23, 1930.  G. F. BARRETT  1,785,886
MOUNTING OF CALENDER ROLLS AND THE LIKE
Filed March 20, 1923  2 Sheets-Sheet 1
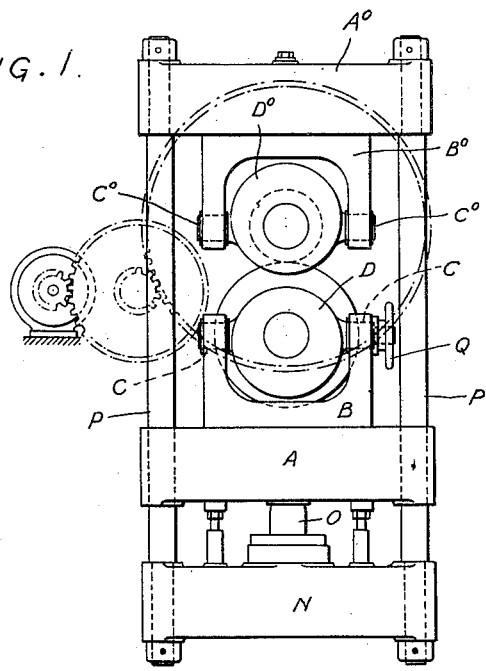
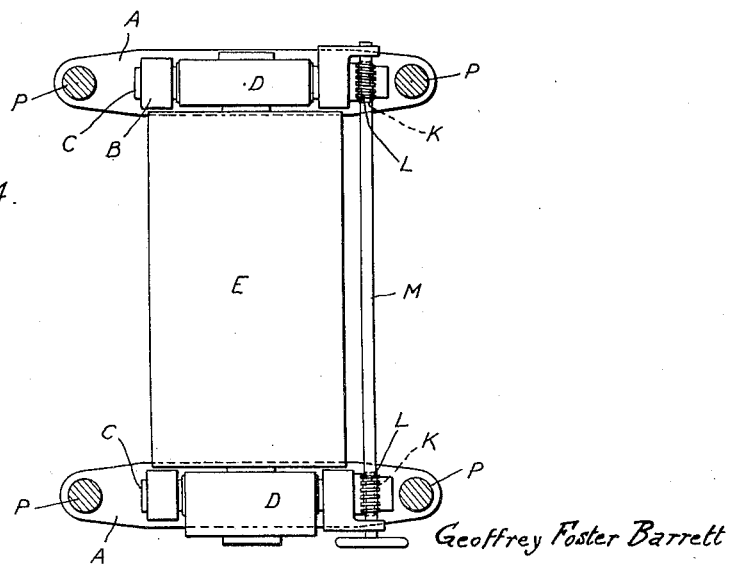
Geoffrey Foster Barrett Dec. 23, 1930.    G. F. BARRETT    1,785,886
MOUNTING OF CALENDER ROLLS AND THE LIKE
Filed March 20, 1923    2 Sheets-Sheet 2

Geoffrey Foster Barrett
by C. P. Goepel
Attorney.

Patented Dec. 23, 1930

1,785,886

UNITED STATES PATENT OFFICE

GEOFFREY FOSTER BARRETT, OF SPRINGFIELD, ENGLAND, ASSIGNOR TO NORMA-HOFFMANN BEARINGS CORPORATION, A CORPORATION OF NEW YORK

MOUNTING OF CALENDER ROLLS AND THE LIKE

Application filed March 20, 1923, Serial No. 626,270, and in Great Britain April 13, 1922.

This invention relates to Schreiner calender and similar apparatus and in particular to the roll bearings and their mountings. In such apparatus the bearings of the upper roll are carried upon a fixed support and those of the lower roll upon a yielding support such as the plungers of hydraulic cylinders.

The primary object of the present invention is to provide an improved construction of such apparatus wherein the rolls run on antifriction bearings mounted in self-aligning housings, and a further object is to provide a mounting for the roll bearings which will afford lateral support of the rolls both top and bottom, independently of the hydraulic plungers.

With these objects, in the improved construction of apparatus constituting the present invention, each of the bearings of the upper roll is supported on a transverse beam secured to a pair of stanchions or equivalent framework, while the bearings for the lower roll are mounted upon beams which are slidable upon the stanchions or frame and are themselves integral with or carried by the hydraulic plungers. The antifriction bearings are preferably of the roller type and the outer races or casings of these bearings are provided with diametrically opposed trunnions which are journalled in brackets carried by the supporting cross beams, and in the case of one roll (or it may be of both rolls) these brackets are so mounted upon their supporting beams as to be capable of rotation about a vertical axis, and to permit relative orientation of the axes of the two rolls, for which latter purpose one or both of the trunnions has an extension provided with worm gear or equivalent mechanism whereby it may be adjusted laterally.

Figure 2:
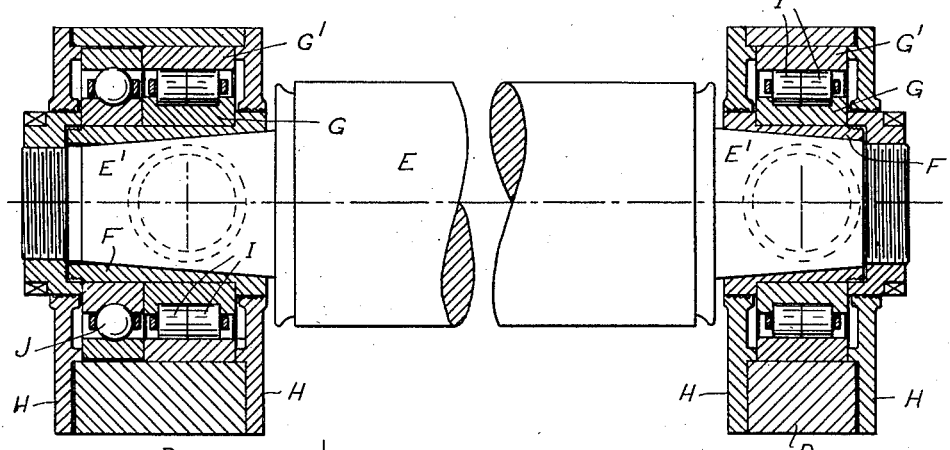
Figure 3:
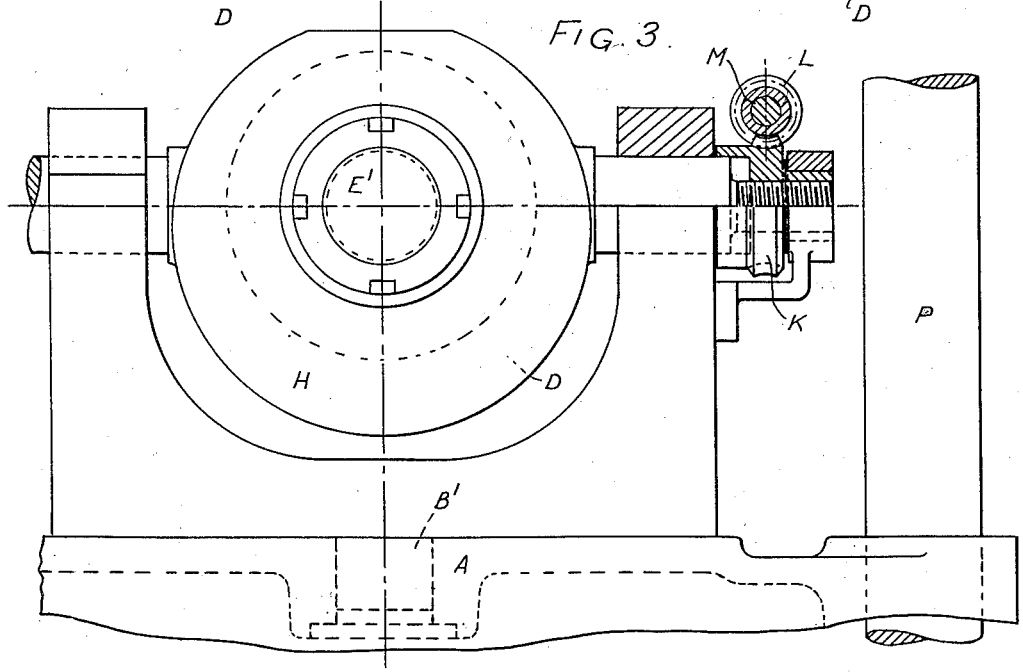

The invention is hereinafter more particularly described with reference to the accompanying drawings, wherein Fig. 1 is a vertical end elevation of a hydraulic Schreiner calender embodying the invention; Fig. 2 a longitudinal elevation partly in section of one of the calender rolls and mounting therefor; Fig. 3 is an end elevation of same partly in section; and Fig. 4 is a plan view of one of the rolls and its mounting. In so far as the present invention is concerned the drawings are illustrative of the housings and bearings both of the upper and lower rolls.

In carrying the invention into effect according to one convenient manner the machine bed N is provided with a cylindrical pillar P at each corner, (Fig. 1), turned and bolted in position. The two pillars P at each end are joined at the top by a cross bar A° and a second cross bar A is slidably mounted below the same. Each of the slidably mounted cross bars is formed in one with or attached to the plunger O of an hydraulic cylinder in the bed N of the machine.

Attached to each top bar, A°, either fixedly as in Fig. 1, or so as to be capable of movement round a vertical axis B¹ in the central vertical plane of the roll journal is a bracket B° formed with two bearings in alignment to receive trunnions C°, C° on a cylindrical housing D° for the top calender roll neck. A corresponding bracket, B, is mounted upon the sliding cross bar, A, to receive the trunnions C, C″ on a cylindrical housing D for the bottom roll neck. This bracket may be mounted as shown in Figs. 1 and 3 so as to be capable of movement about a vertical axis, or it may be rigidly mounted on the sliding cross bar when the brackets B° are mounted to pivot upon the top bars A°.

The ends E′, E′ of each calender roll E are reduced and slightly tapered to receive a sleeve F with a correspondingly tapered bore, and upon said sleeve is placed the inner race G of a roller bearing, the outer race G′ of which is carried by the before-mentioned cylindrical housing D° or D, which is provided with side plates H to keep the parts together.

Owing to the comparatively great load which said bearings are subjected to, two sets of rollers I are preferably used side by side in the same race and at that end of the calender rolls which receives the end thrust due to the relative inclination of said rolls, a ball bearing is placed on the sleeve F and in the housing D° or D, the balls J running in comparatively deep tracks formed in the two races, but it will be understood that any other suitable means may be provided to take the end thrust.

The trunnions of the bottom cylindrical housings or alternatively of the upper housings are slidably mounted in their bearings and means are provided for displacing them axially in their bearings either at one or both ends of the roll; for example trunnion C (Fig. 3) is extended beyond its bearing, the projecting end is screw-threaded to receive a nut by means of which axial movement may be imparted to the trunnions so that the inclination of the axes of the two rolls relatively to each other may be varied.

Said nut may be in the form of a hand wheel Q (Fig. 1) or, as shown in Figs. 3 and 4, a worm wheel K meshing with a worm L on a longitudinally arranged spindle M by means of which simultaneous movement may be imparted to both ends of said bottom rolls, the worm wheels on the respective trunnions being screwed with a right and left hand thread, so as to move in opposite directions.

The top roll is geared in the usual or other convenient manner to the source of power, and the respective hydraulic cylinders supporting the slidably mounted cross bars are in a circuit with an hydraulic accumulator or other source of pressure fluid.

By these means an hydraulic Schreiner calender is produced wherein all undue friction is eliminated and the rolls are supported in a manner to obviate all vibrations or relative transverse movements in use.

I claim:

1. A mounting for calender rolls and the like comprising a housing for the journal bearing at each end of a roll and means for simultaneously shifting the two housings of a roll in opposite lateral directions.

2. A mounting for calender rolls and the like comprising a housing for the journal bearing at each end of a roll, trunnions for mounting the bearings, and means for simultaneously shifting the trunnions axially to move said bearings in opposite senses.

3. A mounting for calender rolls and the like, comprising a machine bed, vertical pillars secured at the four corners of said bed, fixed cross bars connecting the upper ends of the two pillars at each end of the bed, a second set of cross bars slidably mounted on the pillars below the said fixed cross bars, brackets mounted on each of said cross bars, a pivotal connection between one set of cross bars and the brackets mounted thereon, journal bearings for the roll, housings for the roll journal bearings, and horizontal trunnions on said housings journalled in the brackets mounted upon the several cross bars.

4. A mounting for calender rolls and the like comprising a machine bed, vertical pillars secured at the four corners of the said bed, fixed cross bars connecting the upper ends of the two pillars at the end of the bed, slidable cross bars mounted on the pillars below the said fixed cross bars, brackets mounted on each of the said cross bars, a pivotal connection between each of the slidable cross bars and the bracket mounted thereon, journal bearings for the roll, housings for the roll journal bearings and horizontal trunnions on said housings journalled in the brackets mounted upon the several cross bars.

5. A mounting for calender rolls, comprising antifriction bearings at the ends of each roll, a cylindrical housing for each bearing, horizontal trunnions on said housing, a bracket having bearings for said trunnions, a support for said bracket, a central vertical pivot connection between said support and bracket, and means for simultaneously shifting the trunnions of the two housings of a roll axially in their bearings in opposite directions.

6. A mounting for calender rolls and the like, comprising a housing for the journal bearing at each end of the roll, horizontal trunnions on said housing, a bracket for each of the rolls capable of movement around a vertical axis in the central vertical plane of the roll journal, bearings in said bracket in alinement to receive the said trunnions, a support for said bracket, means for shifting the trunnions axially in said bearings, and means for simultaneously shifting the two housings of the roll in opposite lateral directions.

7. A mounting for calender rolls, comprising a pair of roll journal bearings, a housing for each of said bearings, horizontal trunnions on each of said housings, a bracket for carrying each of said housings, bearings in said brackets for the housing trunnions, a support for each of said brackets, pivotal connections between said supports and said brackets, and means for simultaneously shifting said pair of housings in opposite lateral directions.

8. A mounting for calender rolls or the like comprising a machine bed, fixed cross bars supported by the bed above the same, a second set of cross bars vertically movable on the base below the fixed cross bars, brackets mounted on each of the cross bars and having a vertical pivotal connection therewith, journaled bearings for each roll, housings for the roll journal bearings, and horizontal trunnions on said housings journalled in the brackets mounted on the cross bars and means for adjusting the trunnions axially in said brackets.

9. A mounting for calender rolls or the like comprising a machine bed, fixed cross bars supported by the bed above the same, a second set of cross bars vertically movable on the base below the fixed cross bars, brackets mounted on each of the cross bars and having a vertical pivotal connection therewith, journal bearings for each roll, housings for the roll journal bearings, and horizontal trunnions on said housings journalled in the brackets mounted on the cross bars, and means for adjusting the trunnions in opposite directions.

10. A mounting for calender rolls, comprising a pair of roll journal bearings, housings for the bearings and means for shifting the housings simultaneously, horizontal trunnions on the housings at right angles to the bearings for the roll, brackets for carrying said housings, bearings in the brackets for the trunnions, said bracket bearings and trunnions cooperating with a smooth fit to permit the trunnions to freely have both rotary adjustment and axial adjustment, means for shifting the trunnions axially in said bracket bearings, supporting means for said brackets, and pivotal connections between said supporting means and said brackets.

In testimony whereof I have signed my name to this specification.

GEOFFREY FOSTER BARRETT.